Figure 1:
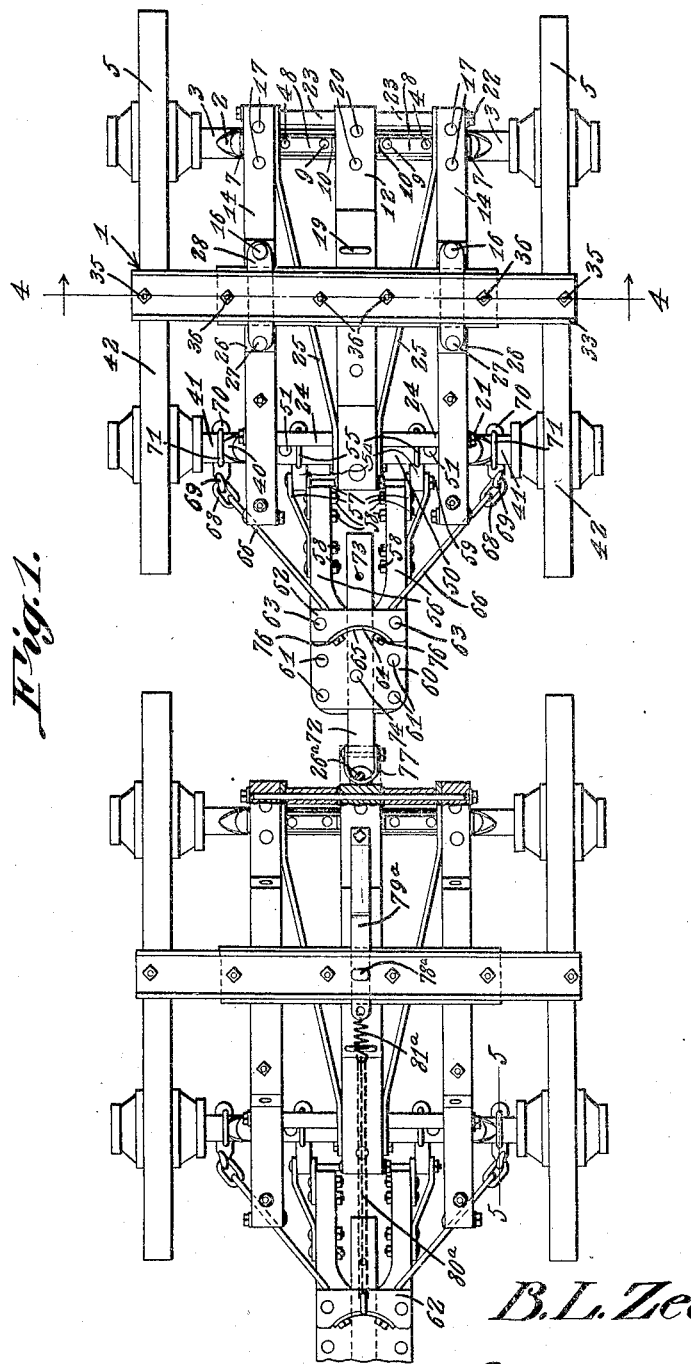

Sept. 30, 1924.                                                                    1,510,072
                        B. L. ZEAGLER
                      EIGHT-WHEEL WAGON
                    Filed May 14, 1921                    4 Sheets-Sheet 1

Inventor
B.L.Zeagler,
By C.A.Snow&Co.
Attorneys

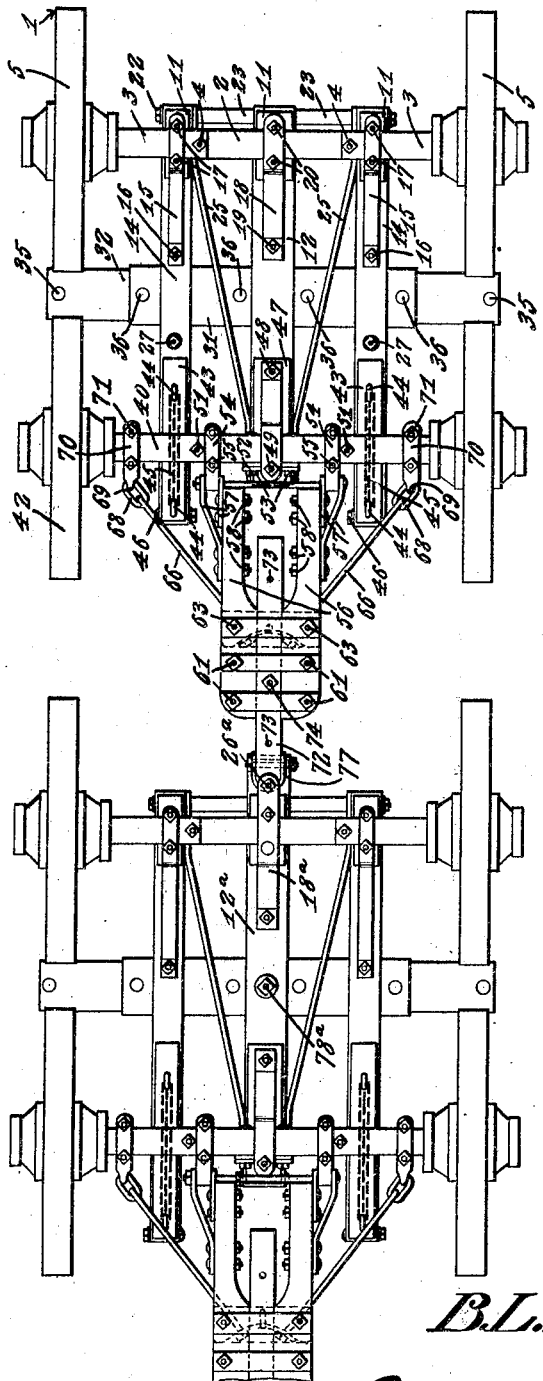

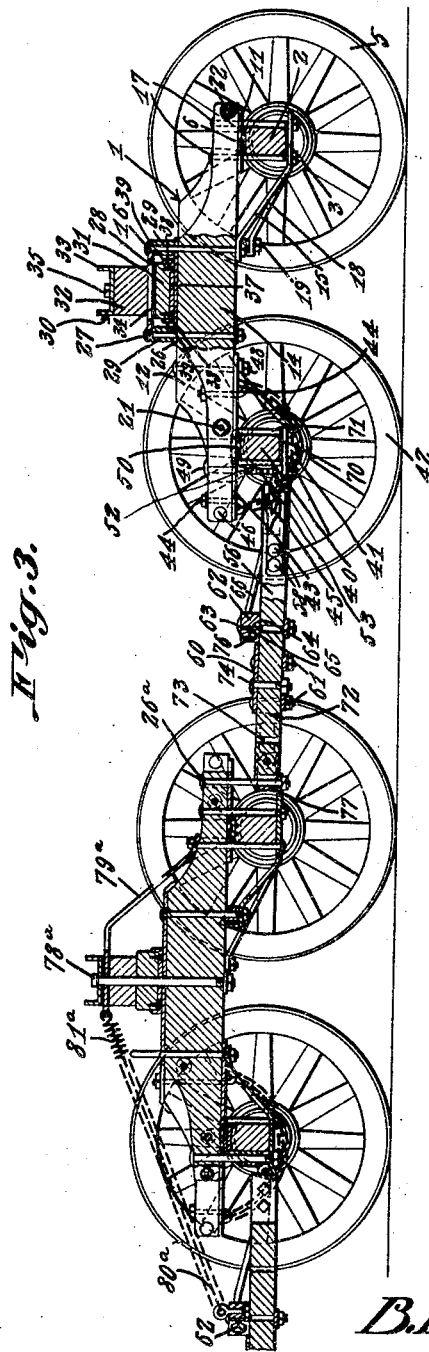

Sept. 30, 1924.                    1,510,072
B. L. ZEAGLER
EIGHT-WHEEL WAGON
Filed May 14, 1921      4 Sheets-Sheet 4
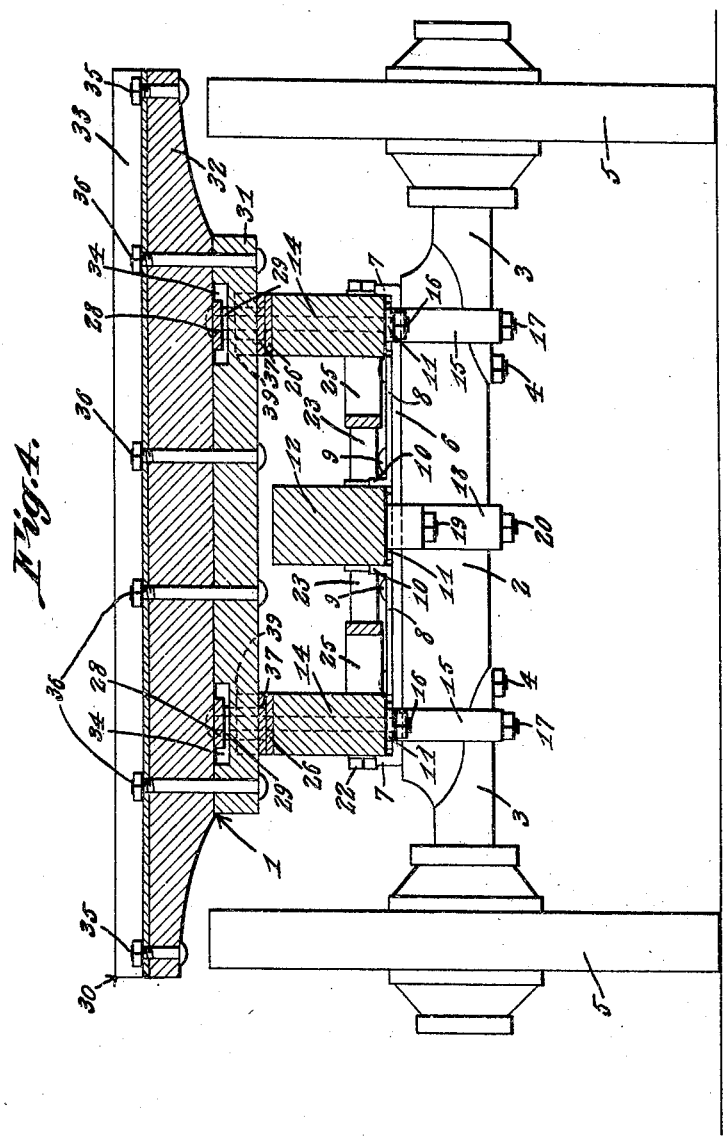
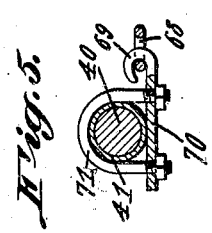
Inventor
B.L.Zeagler,
By C.A.Snow&Co.
Attorneys Patented Sept. 30, 1924.

1,510,072

UNITED STATES PATENT OFFICE.

BENNIE LEE ZEAGLER, OF LUFKIN, TEXAS, ASSIGNOR TO THE MARTIN WAGON COMPANY, OF LUFKIN, TEXAS.

EIGHT-WHEEL WAGON.

Application filed May 14, 1921. Serial No. 469,596.

*To all whom it may concern:*

Be it known that I, BENNIE LEE ZEAGLER, a citizen of the United States, residing at Lufkin, in the county of Angelina and State of Texas, have invented a new and useful Eight-Wheel Wagon, of which the following is a specification.

The device forming the subject matter of this application is an eight wheeled wagon embodying two trucks, each consisting of four wheels.

The invention aims to provide novel means for supporting the tongue, to provide novel means for controlling the movement of the forward axle of each truck, to provide novel means for connecting the king bolt with the forward axle of the truck, to provide novel means for mounting the bolster, to improve the means whereby the rear axle of each truck is connected to the body portion of the truck and, generally, to improve and to enhance the utility of devices of that type to which the invention appertains, in ways to be pointed out hereinafter.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention; Figure 2 shows in bottom plan, a device constructed in accordance with the invention; Figure 3 is a longitudinal section, wherein parts appear in elevation; Figure 4 is a cross section on the line 4—4 of Figure 1; Figure 5 is a fragmental transverse section taken through the forward axle.

The device forming the subject matter of this application includes a rear truck denoted by the numeral 1 and embodying a rear axle 2 carrying skeins 3 attached by securing elements 4 to the axle 2. Rear ground wheels 5 are mounted to rotate with respect to the skeins 3 on the ends of the rear axle 2. A main plate 6 is superposed on the axle 2 and has upstanding outer ends 7. The securing elements 4 not only attach the skeins 3 to the axle 2 but, as well, hold the main plates on the axle. Auxiliary plates 8 are superposed on the main plate 6, the securing elements 4 engaging the outer ends of the auxiliary plates. The auxiliary plates 8 are held in place, further, by securing devices 9 engaged with the main plate 8. The auxiliary plates 8 are provided with upstanding inner ends 10. Washer strips 11 extend transversely of the main plate 6 and are supported thereon.

An intermediate longitudinal beam 12 and side beams 14 extend transversely of the rear axle 2 and rest on the washer strips 11. Downwardly and rearwardly inclined brackets 15 are located beneath the side beams 14. The forward ends of the brackets 15 are connected to the side beams 14 by securing members 16. The brackets 15 extend beneath the rear axle 2 and bear on the skeins 3. Securing elements 17 are engaged with the rear ends of the brackets 15, the rear axle 2 being located between the securing elements, the securing elements passing upwardly through the washer strips 11 and through the side beams 14. A bracket 18 is located beneath the intermediate beam 12 and extends downwardly and rearwardly across the lower edge of the axle 2.

The forward end of the bracket 18 is connected by a securing member 19 with the intermediate beam 12. Securing elements 20 are mounted in the rear end of the bracket 18, the axle 2 being located between the securing elements. The securing elements 20 pass through the intermediate washer strip 11 and through the intermediate beam 12. The beams 12 and 14 are connected at their forward ends by a front tie bolt 21, the rear ends of the beams 12 and 14 being connected by a rear tie bolt 22. Spacers 23 are mounted on the rear tie bolt 22 and are located between the beams 14 and 12. Spacers 24 are mounted on the front tie bolt 21 and are located between the beams 12 and 14. Rearwardly diverging braces 25 are supplied. The forward ends of the braces 25 bear on the intermediate beam 12 and are held thereagainst by the spacers 24, the front tie bolt 21 passing through the forward ends of the braces 25. The rear ends of the braces 25 bear against the side beams 14, the rear tie bolt 22 passing through the rear ends of the braces, and the spacers 23 serving to hold the rear ends of the braces 25 in abutment with the side beams 14.

Wear strips 26 are mounted on the side beams 14. The securing members 16 pass through the wear strips. Securing elements 27 pass through the wear strips and are mounted in the side beams 14. Spacers 29 are carried by the securing members 16 and 27 and are interposed between the wear strips 26 and bridge pieces 28 which are spaced vertically from the wear strips. A bolster 30 is provided. The bolster 30 is a composite structure, including a lower member 31, an intermediate member 32 and a channel 33 or upper member superposed on the intermediate member 32. The lower member 31 of the bolster is provided in its upper edge with openings 34 through which the bridge pieces 28 pass, the construction being such that the bolster may have limited movement, longitudinally of the vehicle, between the spacers 29. Bolts 35 or the like connect the end portions of the members 33 and 32 of the bolster. Bolts 36 connect the members 31, 32 and 33 of the bolster. Shoes 37 extend transversely of the lower member 31 of the bolster and are secured thereto as indicated at 38, the shoes having upstanding ends 39 cooperating with the side surfaces of the lower member 31 of the bolster, the shoes being in slidable contact with the wear strips 26, the bolster thus being supported from the side beams 14.

The numeral 40 designates the front axle of the rear truck 1, the front axle having skeins 41. Front ground wheels 42 are journaled on the ends of the front axle 40. Wear plates 43 extend longitudinally of the side beams 14 and are connected thereto by securing elements 44. The securing elements 44 are connected, at their lower ends, to flexible members 45, such as chains, extended beneath the front axle 40. At their forward ends, the side beams 14 are strengthened by cross bolts 46. A wear plate 47 extends longitudinally of the forward end of the intermediate beam 12 and is connected thereto by a rear securing element 48 and by a forward king bolt 49. A wear strip 50, corresponding to the main plate 8, is mounted on the front axle 40 and is connected thereto by the bolts 51 which hold the skeins 41 in place, the wear strip 50 having slidable contact with the wear plates 43 and 47. Plates 52 are attached by securing devices 53 to the forward edge of the axle 40 and form a bearing for the king bolt 49, the construction, obviously, being such that the front axle may have the necessary swinging movement.

Hangers 54 are secured to the front axle 40 by U-bolts 55. Draft members 56 are provided and hinge strips 57 are secured at 58 to the rear ends of the said members. The rear ends of the strips 57 are mounted on a bolt 59 carried by the hangers 54. Plates 60 extend transversely of the forward ends of the parts 56 and are connected thereto by securing members 61. A projection 62, in the form of a block, is mounted on the uppermost plate 60 and is secured as shown at 63 to the members 56. The projection 62 has a concaved recess 64 in its forward face, wherein is seated a wear plate or washer 65. Braces 66 are shown, the forward ends of the braces extending through the block or projection 62 and through the plate 65. Nuts 76 are threaded on the forward ends of the braces 66, and engage the wear plate 65. The braces 66 diverge, as they extend rearwardly, and are connected by flexible elements 68, such as chains, to hooks 69, formed on plates 70, secured to the front axle 40 by U-bolts 71. (See Figure 5.)

A reach 72 is mounted for longitudinal adjustment between the forward ends of the members 56, the reach 72 carrying any desired number of opening 73 for the reception of a pin or bolt 74 mounted in the plates 60 which connect the members 56. The construction, obviously, is such that, by shifting the reach 72 lengthwise, the distance between the front and rear trucks may be adjusted.

The reach 72 together with the members 56 can swing vertically on the bolt or rod 59. The nuts 76 may be rotated, thereby causing the braces 66 to move lengthwise in the block or projection 62, and, in this way, the front axle 40 may be disposed at right angles to the parts 56, and be so located that, under draft, the front axle will stand parallel to the rear axle 2, the front wheels 42 being disposed parallel to the rear wheels 5.

The front truck is constructed like the rear truck, with the exception of a few variations. In view of the foregoing, the parts of the front truck are designated by numerals previously used, saving when distinguishing characteristics exist, these characteristics peculiar to the front truck being designated by numerals with the suffix "a." The intermediate beam 12$^a$ of the front truck and the corresponding bracket 18$^a$ are lengthened, beyond the rear axle of the front truck, and are connected by an additional bolt 26$^a$ receiving a clevis 77 attached to the reach 72 of the rear truck, a pivotal connection between the trucks thus being afforded. The bolster of the front truck is connected pivotally to the intermediate beam of the front truck by a bolt 78$^a$, the construction being such that relative pivotal movement between the bolster of the front truck and the body portion thereof is possible. An arm 79$^a$ is connected at its rear end to the intermediate beam of the front truck and extends across the bolster of the front truck, the member 79$^a$ being mounted on the bolster bolt 78ª, as shown in Figure 3. A flexible element 80ª, such as a chain, is connected to the hound block 62 of the front truck by a retractile spring 81ª connecting the rear end of the flexible element 80ª with the forward end of the arm 79ª. The function of the spring 81ª and the flexible element 80ª is to take the weight of the tongue of the forward truck off the draft animals.

Having thus described the invention, what is claimed is:

1. In a device of the class described, a frame; a rear axle carried by the frame; a front axle mounted to swing with respect to the frame; draft members carried by the front axle; a tongue mounted in the draft members; a block connecting the draft members; connections having their rear ends assembled with the forward axle, the forward ends of the connections being slidable in the block; and adjusting devices on the forward ends of the connections and cooperating with the block.

2. In a device of the class described, a frame; a rear axle carried by the frame; a forward axle mounted to swing with respect to the frame; draft members; means for connecting the draft members with the forward axle; a block uniting the draft members and having a concavity in its forward face; a wear plate seated in the concavity; connections having their rear ends assembled with the axle, the connections passing slidably through the block and the wear plate; adjusting devices on the forward ends of the connections and cooperating with the wear plate; and a tongue carried by the draft members.

3. In a device of the class described, a frame; a rear axle mounted on the frame; a forward axle mounted to swing with respect to the frame; draft members; means for connecting the draft members with the front axle for vertical swinging movement; plates connecting the draft members; a tongue mounted for longitudinal adjustment between the plates and between the draft members; means for holding the tongue in adjusted positions; a block superposed on one of the plates; connections having their rear ends assembled with the forward axle, the forward ends of the connections being longitudinally adjustable in the block; and adjusting elements on the forward ends of the connections and cooperating with the block.

4. In a device of the class described, longitudinal beams; a rear axle assembled with the beams; a forward axle; a king bolt connecting the forward axle with one of the beams; wear plates on others of the beams and cooperating with the axle; securing elements connecting the wear plates with said other beams; flexible elements assembled at their ends with the securing elements and extended beneath the axle; and draft means carried by the forward axle.

5. In a device of the class described, an axle; skeins thereon; wheels on the axle and journaled for rotation with respect to the skeins; a main plate superposed on the axle and having upstanding outer ends; auxiliary plates on the main plate and having upstanding inner ends; securing elements connecting the axle, the skein, and both plates; outer longitudinal beams engaged by the upstanding ends of the main plate; an intermediate longitudinal beam engaged by the upstanding ends of the auxiliary plates; a forward axle cooperating with the beams; and ground wheels on the axles.

In testimony that I claim the foregoing as my own, I have hereto affixed my signature in the presence of two witnesses.

BENNIE LEE ZEAGLER.

Witnesses:
J. W. LEWIS,
K. W. DENMAN.